(12) United States Patent
Liao et al.

(10) Patent No.: US 9,061,543 B2
(45) Date of Patent: Jun. 23, 2015

(54) WHEEL HUB

(71) Applicants: Yuan-Hong Liao, Dongguan (CN); Kuo-Ting Liao, Dongguan (CN)

(72) Inventors: Yuan-Hong Liao, Dongguan (CN); Kuo-Ting Liao, Dongguan (CN)

(73) Assignee: QUSET COMPOSITE TECHNOLOGY CORPORATION, Dongguan, Guangdong (CH)

( * ) Notice: Subject to any disclaimer, the term of this patent is extended or adjusted under 35 U.S.C. 154(b) by 0 days.

(21) Appl. No.: 13/927,249

(22) Filed: Jun. 26, 2013

(65) Prior Publication Data

US 2013/0285437 A1 Oct. 31, 2013

Related U.S. Application Data

(62) Division of application No. 12/994,860, filed as application No. PCT/CN2009/071936 on May 22, 2009, now Pat. No. 8,662,599.

(30) Foreign Application Priority Data

Jun. 4, 2008 (CN) ...................... 2008 2 0048724 U

(51) Int. Cl.
  *B60B 3/10* (2006.01)
  *B60B 5/02* (2006.01)

(52) U.S. Cl.
  CPC .... *B60B 3/10* (2013.01); *B60B 5/02* (2013.01)

(58) Field of Classification Search
  CPC ............. B60B 3/02; B60B 3/10; B60B 5/00; B60B 5/02; B60B 21/00; B60B 21/02; B60B 25/002; B60B 25/004; B60B 2360/36
  USPC ............. 301/95.101, 95.102, 64.701, 64.702, 301/64.201, 64.202, 64.203, 64.301, 301/64.302, 64.303, 64.304, 64.306, 301/95.103; 295/21, 22, 23, 30
  See application file for complete search history.

(56) References Cited

U.S. PATENT DOCUMENTS

| | | | | |
|---|---|---|---|---|
| 3,826,538 A | * | 7/1974 | Lipper | 301/64.306 |
| 3,968,996 A | * | 7/1976 | Wilcox | 301/37.43 |
| 4,741,578 A | * | 5/1988 | Viellard | 301/64.704 |
| 6,736,463 B2 | * | 5/2004 | Bazzoni et al. | 301/64.306 |
| 7,258,402 B2 | * | 8/2007 | Meggiolan | 301/95.103 |
| 7,272,258 B2 | * | 9/2007 | Berkner et al. | 382/176 |
| 7,646,994 B2 | * | 1/2010 | Yoshizuka et al. | 399/12 |
| 8,052,224 B2 | * | 11/2011 | Luo et al. | 301/63.103 |
| 8,070,253 B2 | * | 12/2011 | Kuroda et al. | 347/23 |
| 2003/0107260 A1 | * | 6/2003 | Ording et al. | 301/95.102 |
| 2008/0265657 A1 | * | 10/2008 | Reuteler | 301/95.101 |

* cited by examiner

*Primary Examiner* — S. Joseph Morano
*Assistant Examiner* — Jean Charleston

(57) ABSTRACT

A wheel hub includes a wheel rim and a support. The wheel rim has an inner rim surface, an outer rim surface and a connection concave. The wheel rim is composed of a metallic layer and a carbon fiber layer. The outer rim surface has an outer wall to be the metallic layer. The wheel hub is composed of the metallic layer and the carbon fiber layer. Compared to the conventional wheel hub made of a single metallic material or a carbon fiber material, the wheel hub made of metal and carbon fiber of the present invention is light in weight, endurable, and cost-effective. The outer wall of the outer rim surface of the conventional wheel hub is easily to be damaged by an external force when in use, which result in a break of the carbon fiber to lose the strength of the carbon fiber. By contrast, the present invention has the metallic layer to protect the outer wall of the outer rim surface of the wheel rim, so that the carbon fiber layer of the wheel rim won't be hit by an external force so as to enhance the quality of the wheel hub.

2 Claims, 6 Drawing Sheets

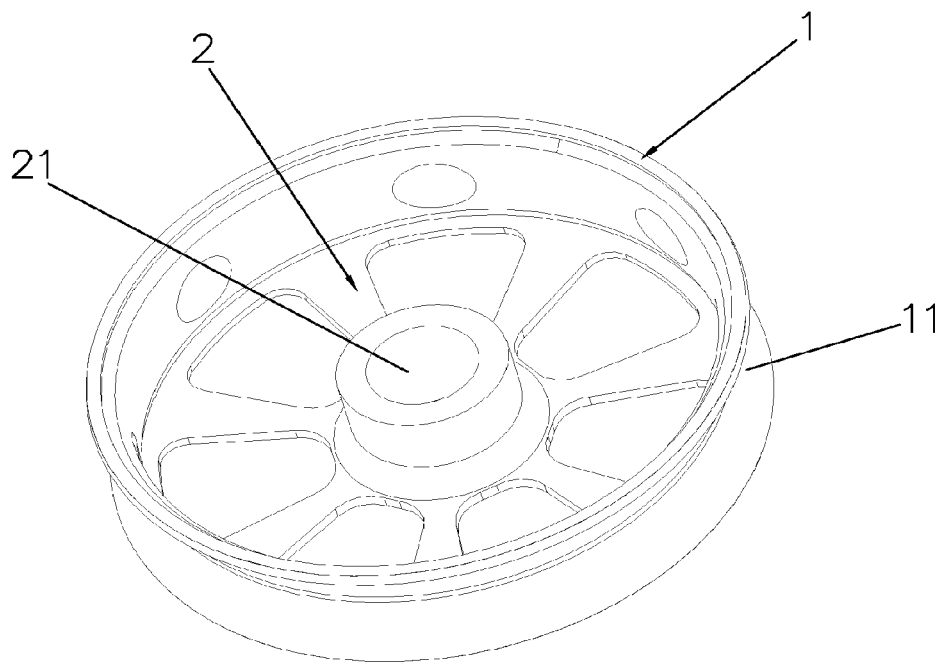
F I G. 9
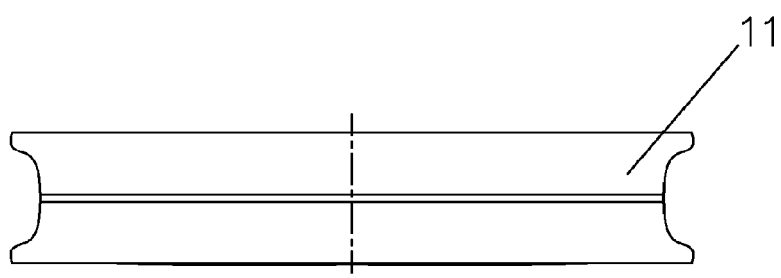
F I G. 10

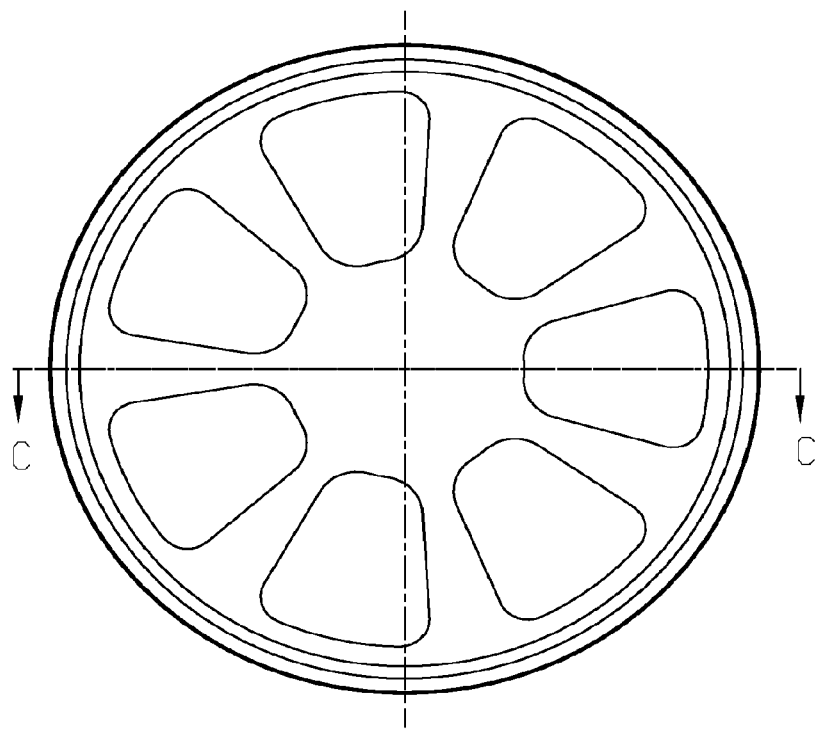
F I G. 11
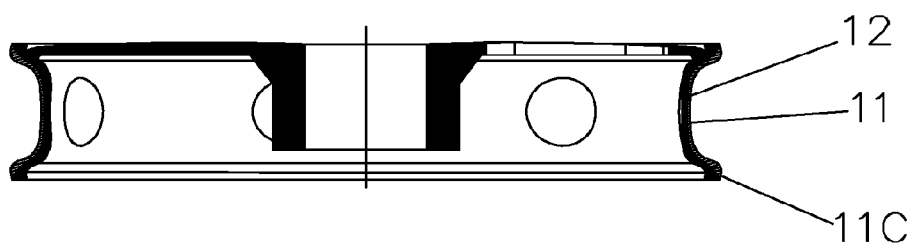
F I G. 12

WHEEL HUB

The present invention is a divisional application of U.S. application Ser. No. 12/994,860 and claims the priority filing date of Nov. 28, 2010, and relates to a wheel hub, and mare particularly, to a wheel hub composed of a metallic layer and a carbon fiber layer.

BACKGROUND OF THE INVENTION

1. Field of the Invention
2. Description of the Prior Art

As everyone knows that a wheel hub comprises a wheel rim and a support. A prior wheel hub is made of a single material, which is better for shock absorption and tenacity. However, it is heavy and cumbersome after assembly, not conforming to today demand. Now, an integral wheel hub made of a carbon fiber material is developed, which is light. But, the cost is high. When in use, the outer rim surface of the wheel rim is exposed. This is often damaged by an external force. When the wheel rim is hit by a hard object, such as a stone, the inside structure of the carbon fiber will change to influence the entire tenacity. Accordingly, the inventor of the present invention has devoted himself based on his many years of practical experiences to solve this problem.

SUMMARY OF THE INVENTION

The primary object of the present invention is to provide a wheel hub, which is light and cost-effective, has a better tenacity and won't be damaged easily.

In order to achieve the aforesaid object, there is provided a wheel hub comprising a wheel rim and a support. The wheel rim has an inner rim surface, an outer rim surface and a connection concave. The wheel rim is composed of a metallic layer and a carbon fiber layer. The outer rim surface has an outer wall to be the metallic layer.

Preferably, the outer rim surface is the metallic layer. The inner rim surface and the connection concave are the carbon fiber layer.

Preferably, the metallic layer comprises a first metallic layer and a second metallic layer. The first metallic layer is the outer rim surface of the wheel rim. The second metallic layer is the inner rim surface of the wheel rim. The connection concave of the wheel rim is the carbon fiber layer. The carbon fiber layer is connected between the first metallic layer and the second metallic layer.

Preferably, the carbon fiber layer has two ends connected to the first metallic layer and the second metallic layer in a semi-wrapped configuration, and the two ends of the carbon fiber layer each have a portion extending to outer surfaces of the first metallic layer and the second metallic layer, respectively. Alternatively, the carbon fiber layer has two ends connected to the first metallic layer and the second metallic layer in a whole-wrapped configuration, and the two ends of the carbon fiber layer each have a portion extending to inner and outer surfaces of the first metallic layer and the second metallic layer, respectively.

Preferably, the metallic layer and the carbon fiber layer are in a multi-layer configuration. The metallic layer is an outer layer and the carbon fiber layer is an inner layer. At least one end of the metallic layer has an extension portion as the outer wall of the outer rim surface. The extension portion of the metallic layer covers an end of the carbon fiber layer so that the carbon fiber layer is not exposed out of the outer wall of the outer rim surface.

Preferably, the connection concave is formed with holes.

Preferably, the support is made of a metallic material or a carbon fiber material.

The feature of the present invention is that the wheel hub is composed of the metallic layer and the carbon fiber layer. Compared to the conventional wheel hub made of a single metallic material or a carbon fiber material, the wheel hub made of metal and carbon fiber of the present invention is light in weight, endurable, and cost-effective. The outer wall of the outer rim surface of the conventional wheel hub is easily to be damaged by an external force when in use, which result in a break of the carbon fiber to lose the strength of the carbon fiber. By contrast, the present invention has the metallic layer to protect the outer wall of the outer rim surface of the wheel rim, so that the carbon fiber layer of the wheel rim won't be hit by an external force so as to enhance the quality of the wheel hub.

BRIEF DESCRIPTION OF THE DRAWINGS

FIG. 9 is a perspective view according to a third embodiment of the present invention;
FIG. 10 is a side view of FIG. 9;
FIG. 11 is a side view of FIG. 9;
and
FIG. 12 is a cross-sectional view taken along line C-C of FIG. 11.

DETAILED DESCRIPTION OF THE PREFERRED EMBODIMENTS

Embodiments of the present invention will now be described, by way of example only, with reference to the accompanying drawings.

Figure 1:
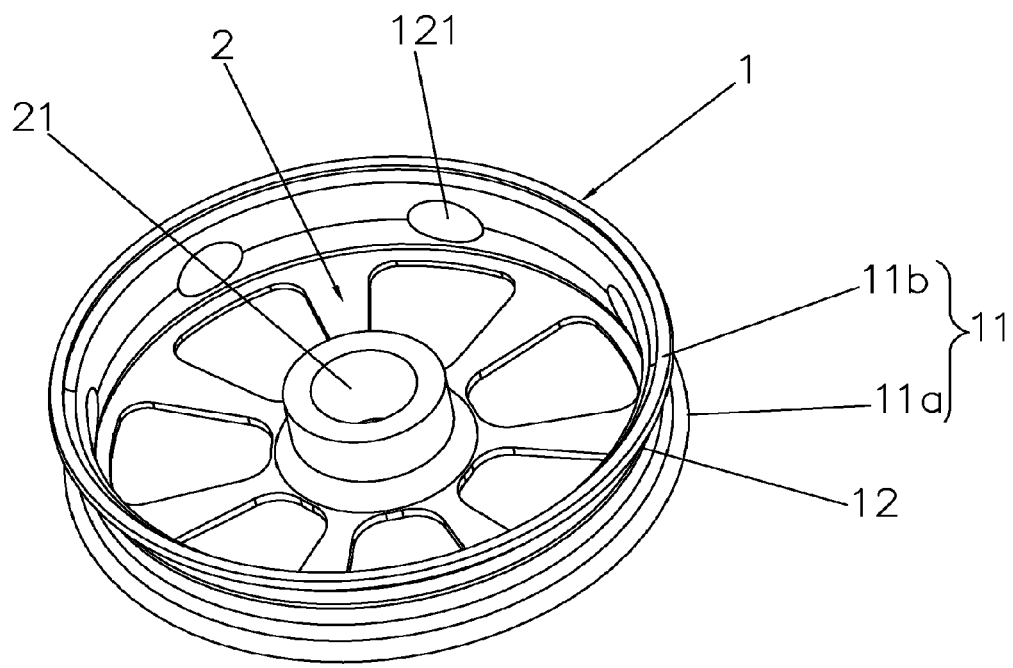
FIG. 1 is a perspective view according to a first embodiment of the present invention.
Figure 2:
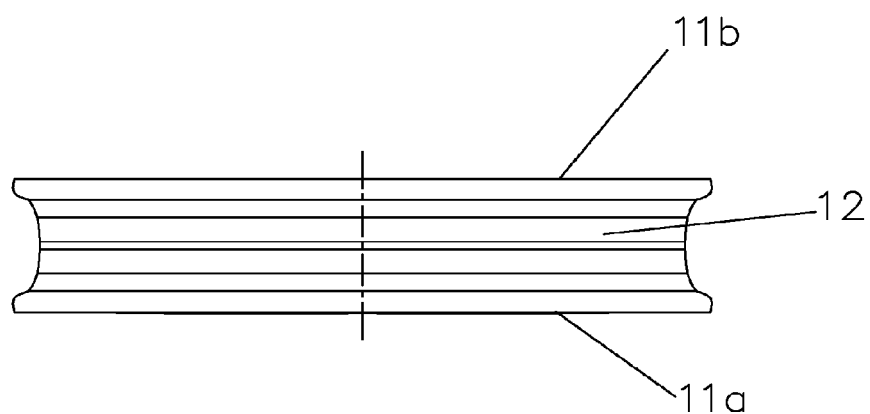
FIG. 2 is a side view of FIG. 1.
Figure 3:
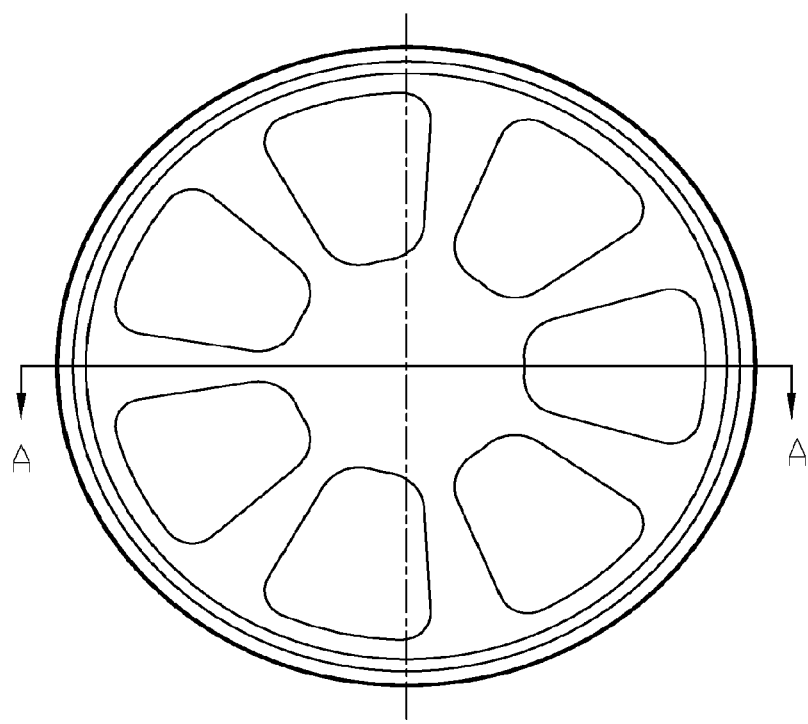
FIG. 3 is a side view of FIG. 1.
Figure 4:
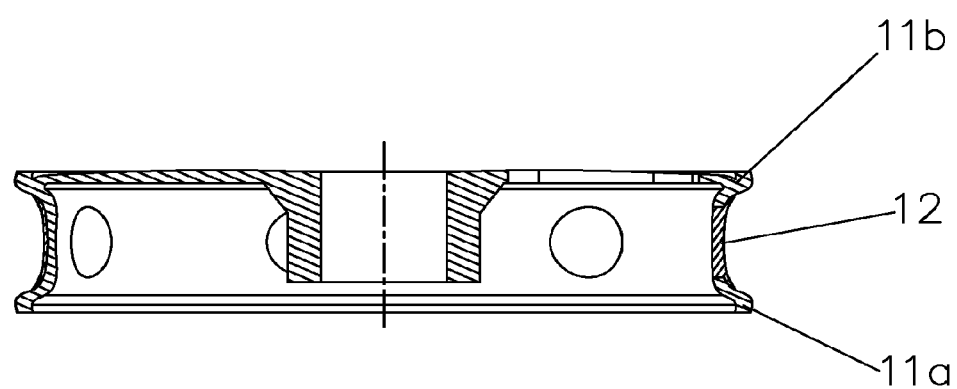
FIG. 4 is a cross-sectional view taken along line A-A of FIG. 3.

As shown in FIG. 1 to FIG. 4, a wheel hub according to a preferred embodiment of the present invention comprises a wheel rim 1 and a support 2. The support 2 is made of a metallic material or a carbon fiber material. The support 2 has a wheel hub mounting axle 21 at a central portion thereof.

The wheel rim 1 is composed of a metallic layer 11 and a carbon fiber layer 12. The metallic layer 11 comprises a first metallic layer 11a and a second metallic layer 11b. The first metallic layer 11a is an outer rim surface of the wheel rim 1, so the outer wall of the outer rim surface is a metallic layer. The second metallic layer 11b is an inner rim surface of the wheel rim 1. The carbon fiber layer 12 is the middle connection concave of the wheel rim 1. The carbon fiber layer 12 is connected between the first metallic layer 11a and the second metallic layer 11b. The carbon fiber layer 12 has two ends connected to the first metallic layer 11a and the second metallic layer 11b in a semi-wrapped configuration. The two ends of the carbon fiber layer 12 each have a portion extending to outer surfaces of the first metallic layer 11a and the second metallic layer 11b, respectively, to connect with each other firmly. The connection concave is the carbon fiber layer 12 formed with holes 121 to save the material.

Figure 5:
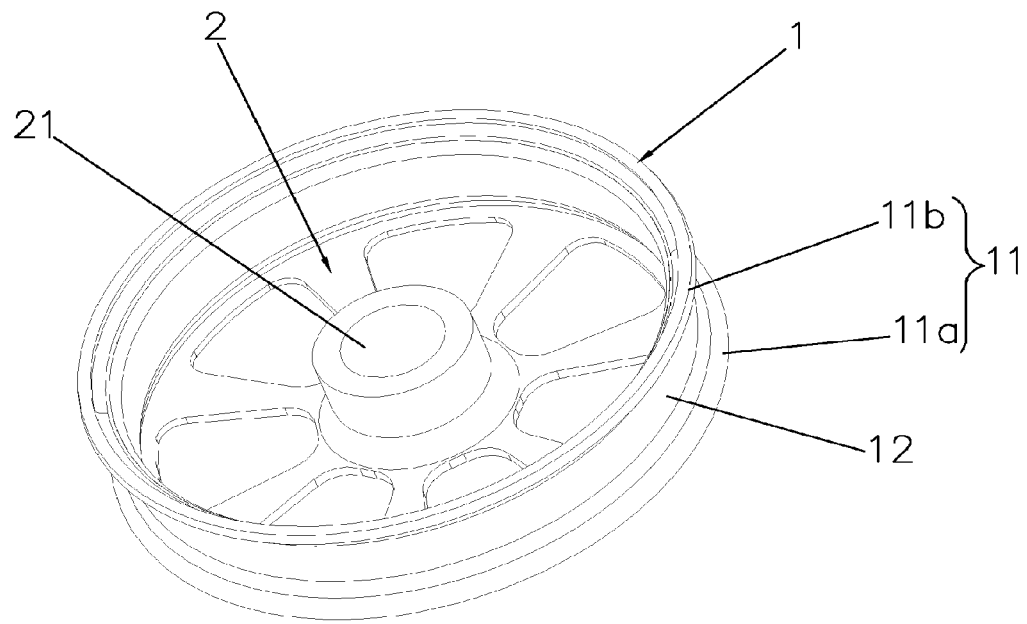
FIG. 5 is a perspective view according to a second embodiment of the present invention.
Figure 6:
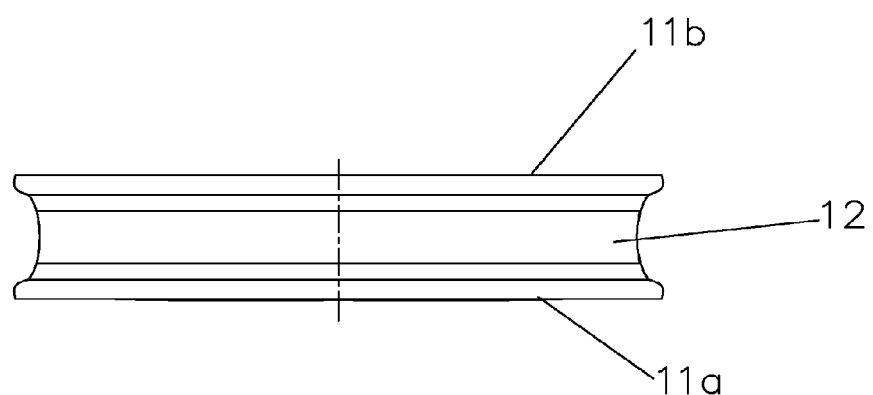
FIG. 6 is a side view of FIG. 5.
Figure 7:
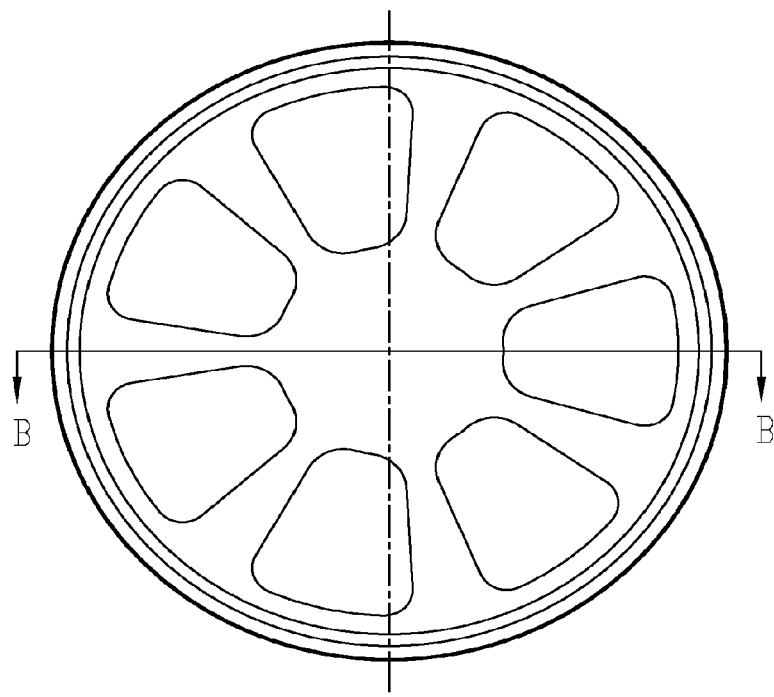
FIG. 7 is a side view of FIG. 5.
Figure 8:
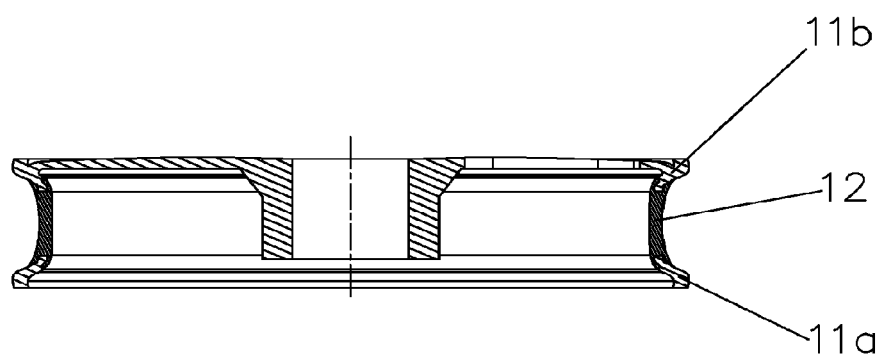
FIG. 8 is a cross-sectional view taken along line B-B of FIG. 7.

As shown in FIG. 5 to FIG. 8, another embodiment of the present invention is substantially similar to the aforesaid embodiment with the exceptions described hereinafter. The two ends of the carbon fiber layer 12 are connected to the first metallic layer 11a and the second metallic layer 11b in a whole-wrapped configuration. The two ends of the carbon fiber layer 12 each have a portion extending to inner and outer surfaces of the first metallic layer 11a and the second metallic layer 11b, respectively, to connect with each other more firmly. In this embodiment, there are no holes on the carbon fiber layer 12. The wheel rim 1 and the support 2 are identical to those of the aforesaid embodiment.

Alternatively, the present invention can have the metallic layer 11 as the outer rim surface as well as the carbon fiber layer 12 as the inner rim surface and the connection concave.

As shown in FIG. 9 to FIG. 12, a further embodiment of the present invention comprises a wheel rim 1 and a support 2. The support 2 is made of a metallic material or a carbon fiber material. The support 2 has a wheel hub mounting axle 21 at a central portion thereof. The wheel rim 1 is composed of a metallic layer 11 and a carbon fiber layer 12. The metallic layer 11 and the carbon fiber layer 12 are in a multi-layer configuration. The metallic layer 11 is an outer layer and the carbon fiber layer 12 is an inner layer. The inner rim surface and the outer rim surface of the wheel rim 1 are composed of the metallic layer 11 and the carbon fiber layer 12. At least one end of the metallic layer 11 has an extension portion 11C as the outer wall of the outer rim surface. The extension portion 11C of the metallic layer 11 covers an end of the carbon fiber layer 12, so that the carbon fiber layer 12 won't be exposed out of the outer wall of the outer rim surface.

The feature of the present invention is that the wheel hub is composed of the metallic layer and the carbon fiber layer. The wheel hub made of metal and carbon fiber of the present invention is light in weight, endurable, and cost-effective. The outer wall of the outer rim surface of the conventional wheel hub is easily to be damaged by an external force when in use, which result in a break of the carbon fiber to lose the strength of the carbon fiber. By contrast, the present invention has the metallic layer to protect the outer wall of the outer rim surface of the wheel rim, so that the carbon fiber layer of the wheel rim won't be hit by an external force so as to enhance the quality of the wheel hub.

Although particular embodiments of the present invention have been described in detail for purposes of illustration, various modifications and enhancements may be made without departing from the spirit and scope of the present invention. Accordingly, the present invention is not to be limited except as by the appended claims.

The invention claimed is:

1. A wheel, comprising
a support, and
a wheel rim, including
i) a metallic layer as an outer layer, and
ii) a carbon fiber layer as an inner layer, wherein the metallic layer and the carbon fiber layer are in a multi-layer configuration: an inner rim surface and an outer rim surface of the wheel rim are composed of the metallic layer and the carbon fiber layer, with at least one end of a cross-section of the metallic layer has an extension portion over an outer wall of the outer rim surface, and the extension portion of the metallic layer covers the at least one end of the cross-section of the carbon fiber layer for the carbon fiber layer not exposed out of the outer wall of the outer rim surface.

2. The wheel as claimed in claim 1, wherein the support is made of a metallic material or a carbon fiber material.

* * * * *